United States Patent [19]
Todd

[11] 3,727,635
[45] Apr. 17, 1973

[54] PRESSURE COMPENSATING TRICKLE RATE FLUID OUTLET

[76] Inventor: Theodore J. Todd, 1039 East Grand Boulevard, Corona, Calif.

[22] Filed: July 12, 1971

[21] Appl. No.: 161,838

[52] U.S. Cl. ........137/513.5, 137/519.5, 137/533.15, 61/12
[51] Int. Cl. ............................................F16k 15/04
[58] Field of Search...............137/202, 513.5, 519.5, 137/533.11, 533.15; 47/48.5; 61/12, 13

[56] References Cited

UNITED STATES PATENTS

| | | | |
|---|---|---|---|
| 3,322,145 | 5/1967 | Prosser | 137/517 |
| 3,343,566 | 9/1967 | Luckenbill | 137/519.5 X |
| 1,011,797 | 12/1911 | Howell | 137/519.5 X |
| 2,909,186 | 10/1959 | Larson | 137/202 |
| 3,518,831 | 7/1970 | Tibbals, Jr. et al. | 61/13 |

*Primary Examiner*—Robert G. Nilson
*Attorney*—Paul A. Weilein

[57] ABSTRACT

A valve cage extending upward from a pressurized fluid source has a lower inlet valve seat and an upper outlet valve seat. Initiation of flow through the cage lifts a ball from the lower seat to close the upper seat with an initial flushing action and thereafter, with the ball held against the upper valve seat by fluid pressure, the outlet flow is limited to a minute recess in the upper valve seat as long as the valve cage remains in communication with the pressurized source. The valve seat is made of a resiliently deformable elastomer for restriction of the minute recess by a rise in fluid pressure against the ball to compensate for the rise in fluid pressure.

10 Claims, 7 Drawing Figures

PATENTED APR 17 1973 3,727,635

INVENTOR
THEODORE J. TODD
BY
Paul A. Weilein
ATTORNEY

PRESSURE COMPENSATING TRICKLE RATE FLUID OUTLET

BACKGROUND OF THE INVENTION

My copending application entitled TRICKLE RATE FLUID OUTLET, Ser. No. 60,523, filed Aug. 3, 1970 now abandoned in favor of continuation application Ser. No. 235,539, filed Mar. 16, 1972 discloses an outlet fitting to dispense a fluid at a minute rate, the invention having special utility as an outlet fitting in a subterranean irrigation system.

An emitter fitting of this character for an underground irrigation system should meet a number of specific requirements. It should have a long service life with no need for frequently uncovering the fitting for inspection and, therefore, the fitting should be inherently reliable. To be reliable, the fitting should be of simple construction with few working parts and should be immune to clogging by corrosion, debris, algae, precipitated mineral deposits, and water seeking roots. It should protect the water line itself from intrusion of troublesome foreign matter and in addition should prevent back flow or siphoning action in the water line. Also, it is highly desirable that the fitting function in such manner that the whole water line is kept full of water for simultaneous initial discharge from all of the fittings along the line.

The underground fitting should release water at a trickle rate, for example, at a rate of approximately 1 gallon per hour, and should do so over a wide range of pressures above 10 p.s.i. This low dispensing rate can maintain moisture in the root zone somewhere between saturation and field capacity, resulting in healthier and more productive plants, with a much greater efficiency of water use.

In such an underground irrigation system, the fluid pressure at each of the various outlet fittings varies with the elevation of the outlet fitting relative to the other outlet fittings of the system. In addition, friction line losses cause the pressures at the outlet fittings to vary inversely with the distance of the fittings from the pressurized source. Consequently, the rates of fluid discharge from the fittings may vary widely for any given magnitude of pressure of the source.

Such variance of the discharge rates of the outlet fittings of an underground irrigation system may be reduced by various well known expedients. One partially successful expedient is to install pressure regulating devices at appropriate locations in the system. Another expedient is to vary the sizes of pipe in the system to compensate for the different distances of the outlet fittings from the pressurized source as well as to compensate for different relative elevations of the outlet fittings. Another expedient is to install appropriate flow-restricting orifices or valves at various points in the system. There is a definite need, however, to avoid resorting to such expedients and to do so by building pressure compensation into each of the trickle outlets of such a system.

SUMMARY OF THE INVENTION

The preferred embodiment of the invention comprises an upright valve cage with a stainless steel ball therein that is free to move between a normal position in a lower inlet valve seat and an alternate position in an upper outlet valve seat. The ball is smaller in diameter than the inside diameter of the cage to permit effective flushing flow past the ball, but nevertheless the ball is of sufficient cross section to be lifted to the upper valve seat by the dynamic pressure of the initial flow and to be thereafter held in its upper closed position by the pressure differential across the ball as long as the valve cage remains in communication with the pressurized source.

When the ball is in the upper valve seat, discharge flow is restricted to a suitable minute by-pass that releases the water at the desired trickle rate. In the preferred practice of the invention the by-pass is simply a recess, notch or groove in the surface of the upper valve seat. A special advantage of such an arrangement is that the ball itself serves as one of the side walls of the by-pass and therefore the whole length of the by-pass is exposed for the initial flushing action that precedes the arrival of the ball at the upper valve seat. In addition, the turbulent flushing flow through the valve cage jiggles the ball against the inner surface of the cage to tend to jar loose any foreign material that may be in the by-pass recess or in the upper valve seat.

The present invention teaches that the desired pressure compensation may be built into such an emitter fitting by simply substituting a resiliently deformable elastomer valve seat member for the usual rigid valve seat member at the upper outlet of the valve cage. With the by-pass formed in part by the recess in the upper valve seat member and formed in further part by the seated steel ball, the fluid pressure inside the cage is transmitted to the elastic valve seat member by the steel ball. Progressive rise in the fluid pressure inside the valve cage causes the seated steel ball to progressively deform the upper elastic valve seat with consequent progressive restriction of the by-pass passage to provide substantial compensation for the rise in pressure. Thus, the emitter fitting tends to maintain a constant rate of discharge flow over a wide range of pressures for which the elastomer valve seat member is designed.

The features and advantages of the invention may be understood from the following detailed description and the accompanying drawing.

BRIEF DESCRIPTION OF THE DRAWING

In the drawing, which is to be regarded as merely illustrative.

DESCRIPTION OF THE PREFERRED EMBODIMENT OF THE INVENTION

Figure 1:
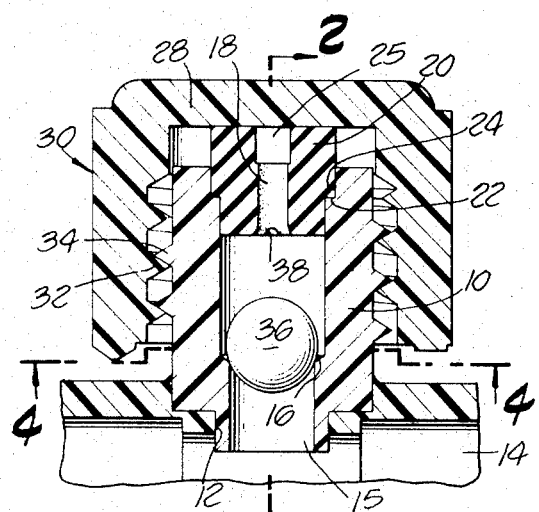
FIG. 1 is a sectional view of the presently preferred embodiment of the fitting with the steel ball in its normal idle position on the lower valve seat.

Referring first to FIG. 1, the selected embodiment of the invention is a dispensing fitting in the form of a valve cage 10 of rigid plastic material that is adapted for mounting in a ¼ inch hole 12 in a plastic pipe 14 that is buried in the ground from 6–12 inches below the surface. In the construction shown, both the hole 12 and the lower end of the valve cage 10 are of stepped configuration and the valve cage is bonded to the plastic pipe by suitable cement.

The valve cage 10 has a lower inlet port 15 which forms a lower valve seat 16 and the upper end of the valve cage has an outlet port 18 that is formed by a valve seat member 20 that is made of a suitable resiliently deformable elastomer. In the initial practice of the invention the valve seat member 20 is made of Buna-n rubber of 85 Shore hardness and the inside diameter of the outlet port is approximately ⅛ inch.

In the construction shown, the upper end of the valve cage is of stepped configuration to form an annular shoulder 22 that faces downstream and the valve seat member 20 is of corresponding stepped configuration with an outer circumferential shoulder 24 that seats against the annular shoulder 22. The elastomer valve member 20 projects above the valve cage 10 and the upper end of the valve seat member is cut away to provide for lateral discharge flow. In this instance the valve seat member is cut away to provide a transverse slot 25 that intersects the axis of the outlet port 18.

The elastomer valve seat member 20 is retained in the upper end of the valve cage by the transverse end wall 28 of a removable cap or closure 30. In the construction shown the cap 30 has an internal screw thread 32 which engages an external screw thread 34 of the valve cage 10. The exterior of the valve cage has a longitudinal groove 35 which cuts across the external screw thread 34 and forms a discharge passage to the exterior of the valve cage.

A valve member for cooperation with the two valve seats may be of any suitable configuration and may be made of any suitable material. In the present embodiment of the invention the valve member is a stainless steel ball 36 which normally rests in the lower inlet valve seat 16 and which is of somewhat smaller diameter than the inside diameter of the cage to provide adequate clearance around the ball for the initial flushing action. Preferably, the cross sectional area of the clearance around the steel ball is greater than the cross sectional area of the inlet port 15 but the cross sectional area of the outlet port 18 is less than the cross sectional area of the inlet port for the purpose of creating relatively high flow velocity through the outlet port when the initial flushing action occurs.

In this particular embodiment of the invention the inside diameter of the valve cage is approximately .370 inch; the diameter of the ball 36 is 5/16 inch; the inside diameter of the lower inlet port 15 is 11/64 inch; and the inside diameter of the outlet port 18 of the upper valve seat member 20 is ⅛ inch.

Any suitable by-pass or restricted passageway may be provided for release of the water at the desired restricted rate when the steel ball 36 is in the upper valve seat that is formed by the valve seat member 20. In this particular embodiment of the invention the restricted passageway is simply a by-pass recess in the form of a notch or groove 38 in the valve seat of the upper valve seat member 20.

Figure 6:
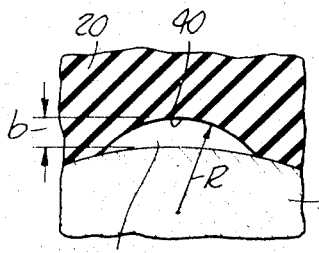
FIG. 6 is an enlarged fragmentary cross section taken as indicated by the line 6—6 of FIG. 5 showing the cross sectional configuration of the by-pass when the fluid pressure in the valve cage is at a relatively low level.
Figure 5:
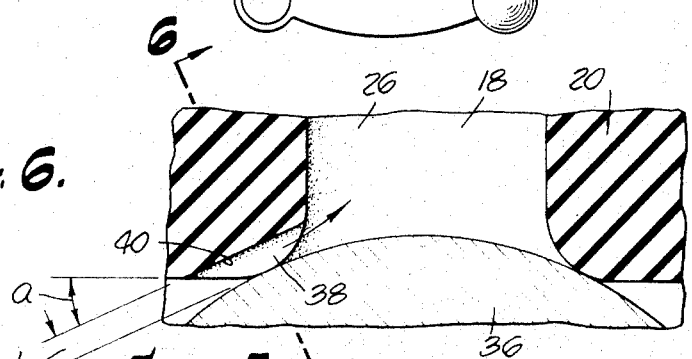
FIG. 5 is a greatly enlarged sectional view showing the steel ball in the upper valve seat and showing how the upper valve seat is recessed to provide the desired minute by-pass.

The passageway 38 may be of any suitable cross sectional configuration but in this instance the passageway has a curved surface 40, the radius of curvature being indicated at R in FIG. 6. In the initial embodiment of the invention the radius R is 3/64 inch. The direction of the restricted passageway is at an acute angle from a plane that is perpendicular to the outlet port 18 of the valve seat member, the angle being designated "$a$" in FIG. 5. Preferably, this angle is in the range of 23°–30°. The cross dimension of the restricted passageway which is designated "$b$" in FIGS. 5 and 6 is preferably in the range of 0.007 to 0.009 inch.

When the pipe 14 is cut off from the pressurized supply, the steel ball 36 is in its lower idle position closing the lower valve seat 16 as shown in FIG. 1. It is to be noted that at this closed position the steel ball not only acts as a check valve to prevent reverse flow into the supply pipe, but also serves as a closure to keep any foreign material in the cage from dropping into the supply pipe.

Figure 2:
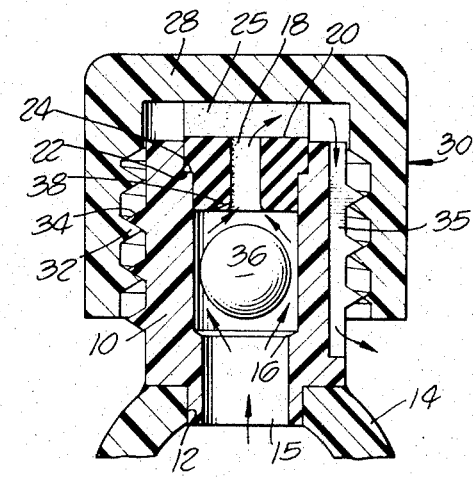
FIG. 2 is a sectional view taken along the line 2—2 of FIG. 1, showing the flushing action that occurs as the ball is lifted towards the upper valve seat.
Figure 3:
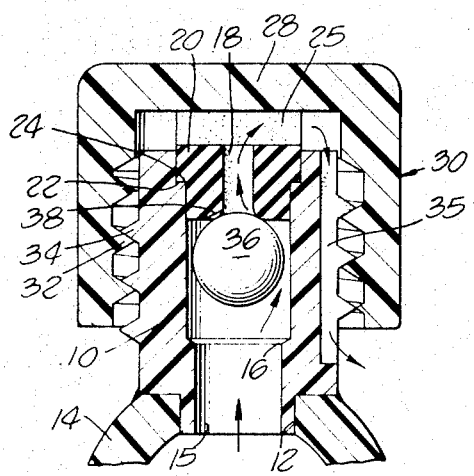
FIG. 3 is a sectional view similar to FIG. 2 showing the steel ball held against the upper valve seat by the fluid pressure inside the valve cage.
Figure 4:
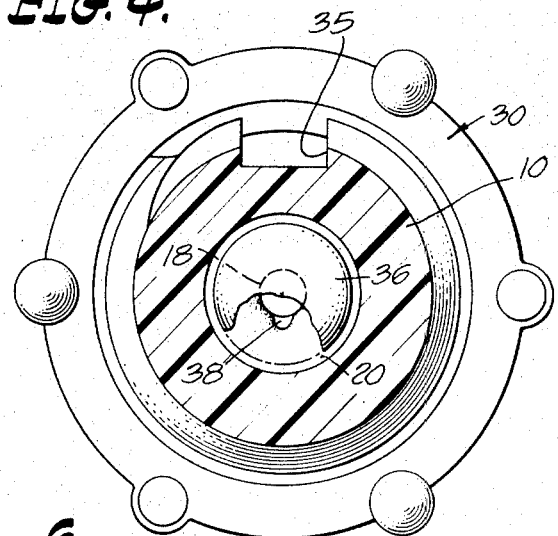
FIG. 4 is an enlarged transverse section taken as indicated by the line 4—4 of FIG. 1 with portions broken away to show the by-pass in the upper valve seat.

When a remote supply valve (not shown) is opened to place the pipe 14 under pressure, say a pressure in the range of 10–30 p.s.i., the steel ball 36 is lifted from the lower valve seat as shown in FIG. 2 and then is carried upward to closed position against the upper valve seat member 20 as shown in FIG. 3. The steel ball is small enough in diameter relative to the inside diameter of the cage to permit the newly admitted water to flow around the ball as indicated by the arrows in FIG. 2, but nevertheless the dynamic pressure against the underside of the ball is sufficient to lift the ball to its upper closed position.

The time it takes for the ball to reach its upper closed position is sufficient to permit the desired initial flushing action. As a consequence of the flushing action, any foreign material that may be in the valve cage is swept out through the upper outlet port 18 and any foreign material that may be in the upper outlet port or in the by-pass recess 38 is also swept out by the local increase in velocity of the flushing flow. It is to be noted that the by-pass 38 is formed by the confronting portions of two members, the first member being the valve seat member 20 and the second member being the steel ball 36, and since the steel ball itself forms one wall of the by-pass when the steel ball is in its upper closed position, the steel ball provides one of the side walls of the by-pass and thus permits the whole length of the by-pass to be exposed to the flushing action prior to the arrival of the steel ball at the upper closed position.

Once the steel ball reaches its upper closed position it is held in place by the pressure differential across the steel ball and the steel ball remains in its upper closed position even though the pressure inside the cage may drop to 1 or 2 p.s.i. As long as the steel ball remains at its upper closed position with the interior of the valve cage in communication with the pressurized source, the discharge from the fitting is restricted to the rate of flow through the by-pass 38 which is a trickle rate that, for example, may be approximately one gallon per hour. When the pipe 14 is cut off from the pressurized source, the interior of the cage drops to atmospheric pressure and the steel ball gravitates to its normal lower idle position.

Figure 7:
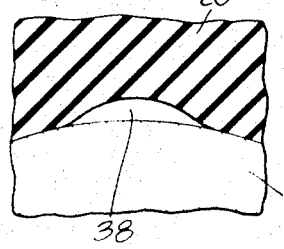
FIG. 7 is a similar view showing how relatively high fluid pressure in the valve cage causes the steel ball to reduce the cross sectional area of the by-pass.

The effect of a substantial increase in fluid pressure on the cross sectional area of the by-pass 38 may be understood by reference to FIGS. 6 and 7. When the steel ball 36 is under moderate fluid pressure the resilient upper valve seat member 20 is deformed to only an insignificant degree as shown in FIG. 6. If the fluid pressure against the steel ball is greatly increased, however, the increased pressure of the steel ball against the valve seat of the elastomer valve seat member 20 deforms the valve seat appreciably with consequent decrease in the cross sectional area of the by-pass 38, as may be understood by comparing FIG. 7 with FIG. 6. In one practice of the invention, for example, the cross sectional area of the by-pass 38 is substantially constant at pressures below approximately 18 pounds per square inch and the rate of fluid discharge from the outlet fitting varies directly with changes in the pressure of the source. At higher pressures, however, the pressure of the steel ball against the upper valve seat reduces the cross sectional area of the by-pass so that the cross sectional area of the by-pass varies inversely with changes in the fluid pressure inside the valve cage.

Thus, if an outlet fitting is at a substantially lower elevation than the other outlet fittings in the system the by-pass will be correspondingly restricted to tend to equalize the discharge flow of the fitting with the discharge flow of the other fittings in the system. In like manner, if a discharge fitting is relatively close to the pressurized source with the consequence that the pressure in the outlet fitting is relatively high, the relatively high pressure of the steel ball against the elastomer valve seat will reduce the cross sectional area of the by-pass to at least substantially compensate for the higher local fluid pressure.

It is apparent that the cap 30 is normally tightened to hold the elastomeric valve seat member 20 in position and therefore places the valve seat member under compression in an annular zone defined by the annular shoulder 22 of the valve cage. It is to be noted, however, that this annular compressed zone is remote from the by-pass recess 38 and does not affect the cross sectional configuration of the by-pass recess.

In the described embodiment of the invention the valve member is biased by gravity to its closed position and the valve cage is positioned upright for this purpose. It is obvious, however, that the valve member may be biased to its normal closed position by spring pressure and that the valve cage need not be in upright position.

My description in specific detail of the presently preferred embodiment of the invention will suggest various changes, substitutions and other departures from my disclosure within the spirit and scope of the appended claims.

I claim:

1. In a device of the character described for releasing fluid at a low rate from a pressurized source with compensation for changes in the fluid pressure at the device, the combination of:

a valve cage forming a passage for fluid flow from an inlet port of the cage to an outlet port of the cage;

a valve seat member forming a valve seat at the outlet port;

a valve member in the cage, said valve member being biased to an idle position away from the valve seat, said valve member being smaller in cross section than the passage to permit initial fluid flow through the passage to sweep past the valve member to flush out the valve cage and the outlet port, said valve member being of a weight and cross section to be moved from its idle position to the valve seat of the valve seat member by the rising dynamic pressure of the fluid in the passage when fluid flow through the passage is initiated, whereby initiating flow of pressurized fluid through the valve cage results in flushing out the valve cage together with the outlet port and then movement of the valve member into the valve seat, and, finally, retention of the valve member in the valve seat by the pressure differential across the outlet port as long as the cage remains in communication with the pressurized source, said valve seat of the valve seat member having a minute recess to release the pressurized fluid to the outlet port when the valve member is seated in the valve seat, said valve seat member being made of resiliently deformable elastomer for progressive deformation by progressive increase in the pressure of the valve member against the valve seat in response to rise in said pressure differential, said recess being shaped, dimensioned, and located to be progressively restricted by progressive rise in said pressure differential against the valve member thereby to minimize the affect of variations in the magnitude of the pressure differential on the rate of flow through the minute recess, the outlet port of the valve cage being formed with a surrounding annular shoulder that faces downstream, the valve seat member being mounted in the outlet port, the valve seat member being of stepped configuration with a circumferential shoulder that faces upstream and seats against the annular shoulder;

and retaining means abutting the downstream side of the valve seat member and pressing the valve seat member against said annular shoulder, the valve seat member thereby being under longitudinal compression in an outer circumferential zone corresponding to said annular shoulder, said recess in the valve seat member being at an inner circumferential zone spaced radially inwardly from said outer circumferential zone so that the recess is substantially unaffected by the compression of the valve seat member in said outer circumferential zone.

2. A combination as set forth in claim 1 in which said inner circumferential zone is spaced axially from the outer circumferential zone.

3. A combination as set forth in claim 1 in which the outlet port of the valve cage is of stepped configuration with said annular shoulder of the outlet port spaced downstream from said recess in the valve seat member;

and in which the valve seat member is formed with an outer circumferential shoulder in abutment with said annular shoulder.

4. A combination as set forth in claim 1 in which the valve seat member projects beyond the downstream end of the valve cage;

and in which the projecting portion of the valve seat member is recessed for lateral flow therefrom of fluid that is released through the valve seat.

5. A combination as set forth in claim 4 in which said retaining means is a releasable cover for the downstream end of the valve cage, the cover and the valve cage cooperating to form a passage to discharge the fluid to the exterior of the valve cage.

6. A combination as set forth in claim 5 in which the valve cage is formed with an outer circumferential screw thread;

and in which the cover is formed with an inner circumferential screw thread in releasable engagement with said outer circumferential screw thread, said two screw threads being shaped and dimensioned for clearance therebetween to form a helical passage for discharge of the fluid to the exterior of the valve cage.

7. A combination as set forth in claim 1 in which the longitudinal axis of the recess is at an angle of approximately 23°–30° from a plane perpendicular to the axis of the annular seat.

8. A combination as set forth in claim 1 in which the valve seat member has a Shore hardness of approximately 85.

9. In a device of the character described for releasing a fluid from a pressurized source at a low rate, the combination of:

a valve cage forming a passage for fluid flow therethrough with an inlet port at one end of the passage to receive fluid from the source and an outlet port at the other end of the passage;

a valve seat member forming a valve seat in said outlet port and projecting beyond the outlet port, said valve seat member being of stepped configuration with an outer circumferential shoulder in abutment with the valve cage, the projecting portion of the valve seat member being recessed for lateral flow therefrom of fluid released through the valve seat; and a valve member in the cage, said valve member being biased to an idle position away from the valve seat, said valve member being smaller in cross section than the passage to permit initial fluid flow through the passage to sweep past the valve member to flush out the valve cage and the outlet port, said valve member being of a weight and cross section to be moved from its idle position to the valve seat by the rising dynamic pressure of the fluid in the passage when fluid flow through the passage is initiated, whereby initiating flow of pressurized fluid through the valve cage results in flushing out the valve cage and outlet port and then movement of the valve member to the valve seat, and, finally, retention of the valve member in the valve seat by the pressure differential across the outlet port as long as the cage remains in communication with the pressurized source, the valve seat of said valve seat member having a minute recess to release the pressurized fluid to the outlet port when the valve member is seated in the valve seat;

and a cover releasably engaging the valve cage and abutting the projecting portion of the valve seat member to hold the outer circumferential shoulder of the valve seat member against the valve cage, said cover forming at least a portion of a passage for discharge of the fluid that is released through the valve cage member.

10. A combination as set forth in claim 9 in which said valve seat member is made of resiliently deformable material for progressive deformation by said valve member in response to progressive rise in said pressure differential, said recess being shaped, dimensioned, and located to be progressively restricted by progressively increasing pressure of the valve member against the valve seat in response to progressive rise in said pressure differential whereby to minimize the effect of variations in the magnitude of the pressure differential on the rate of flow through the recess.

* * * * *